(12) United States Patent
Shields

(10) Patent No.: US 6,968,683 B2
(45) Date of Patent: Nov. 29, 2005

(54) WAVE/BLOWHOLE ELECTRICAL POWER GENERATING PLANT

(75) Inventor: Phillip Kinyon Shields, Tucson, AZ (US)

(73) Assignee: Phillip K. Shields, Tucson, AZ (US)

( * ) Notice: Subject to any disclaimer, the term of this patent is extended or adjusted under 35 U.S.C. 154(b) by 4 days.

(21) Appl. No.: 10/068,507

(22) Filed: Feb. 6, 2002

(65) Prior Publication Data

US 2003/0145586 A1 Aug. 7, 2003

(51) Int. Cl.⁷ .............................................. F03B 13/12
(52) U.S. Cl. .............................. 60/398; 60/502; 290/53
(58) Field of Search .......................... 60/398, 412, 502, 60/497; 417/100; 405/76; 290/42, 53

(56) References Cited

U.S. PATENT DOCUMENTS

| | | | | |
|---|---|---|---|---|
| 655,541 A | * | 8/1900 | Becker | 417/100 |
| 675,039 A | * | 5/1901 | Graff et al. | 60/499 |
| 694,242 A | * | 2/1902 | Borchert et al. | 60/499 |
| 755,728 A | * | 3/1904 | Weems | 417/330 |
| 947,321 A | * | 1/1910 | Blauel | 417/100 |
| 960,478 A | * | 6/1910 | Allard | 417/100 |
| 1,005,911 A | * | 10/1911 | Wilbur | 417/100 |
| 1,008,683 A | * | 11/1911 | Wall | 417/100 |
| 1,147,082 A | * | 7/1915 | Farra | 405/76 |
| 1,369,593 A | * | 2/1921 | Wilkin | 60/499 |
| 1,604,632 A | * | 10/1926 | Carter | 417/330 |
| 1,623,341 A | * | 4/1927 | Hare | 60/398 |
| 1,953,285 A | * | 4/1934 | Arner | 60/498 |
| 1,962,047 A | * | 6/1934 | Young | 417/333 |
| 3,353,787 A | * | 11/1967 | Semo | 60/325 |
| 4,078,871 A | * | 3/1978 | Perkins, Jr. | 417/100 |
| 4,103,490 A | * | 8/1978 | Gorlov | 60/398 |
| 4,132,901 A | * | 1/1979 | Crausbay | 290/53 |
| 4,208,878 A | * | 6/1980 | Rainey | 60/496 |
| 4,222,238 A | * | 9/1980 | McCulloch | 60/398 |
| 4,384,456 A | * | 5/1983 | Boros | 60/499 |
| 4,400,940 A | * | 8/1983 | Watabe et al. | 60/502 |
| 4,469,955 A | * | 9/1984 | Trepl, II | 60/499 |
| 4,564,312 A | * | 1/1986 | Munoz Saiz | 405/76 |
| 5,191,225 A | * | 3/1993 | Wells | 290/53 |

\* cited by examiner

Primary Examiner—Thomas E. Lazo

(57) ABSTRACT

This electrical power generating system is applicable in any location where wave action in blowhole shafts can be constructed in the protection of the geological formation. This system by using high efficiency manmade blowholes is capable of producing large quantities of compressed air. These blowholes are excavated into the natural geological formation by the application of conventional excavation, soil stabilization or construction tunneling methods. Waves entering these blowhole shafts generate a wave piston that compresses trapped air in the excavated blowhole shaft. The compressed air generated in these manmade blowholes is then utilized to drive air-driven motors, water pumps and turbines for running electrical generators. The air processing equipment, high pressure piping, valves, and related instrumentation are made up of standard industrial hardware. Surplus compressed air can also be utilized to run second stage air equipment.

2 Claims, 6 Drawing Sheets

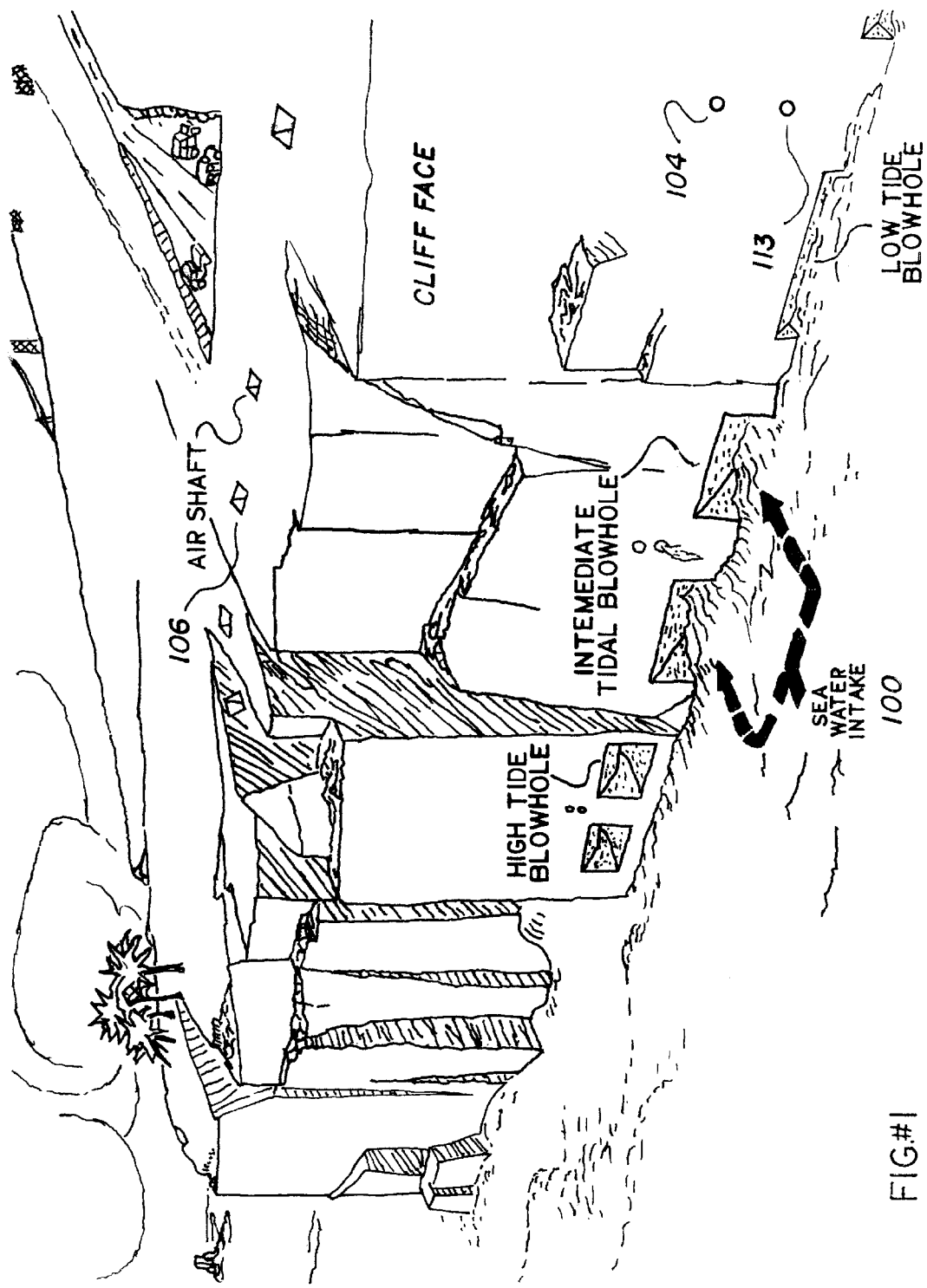
FIG.#1

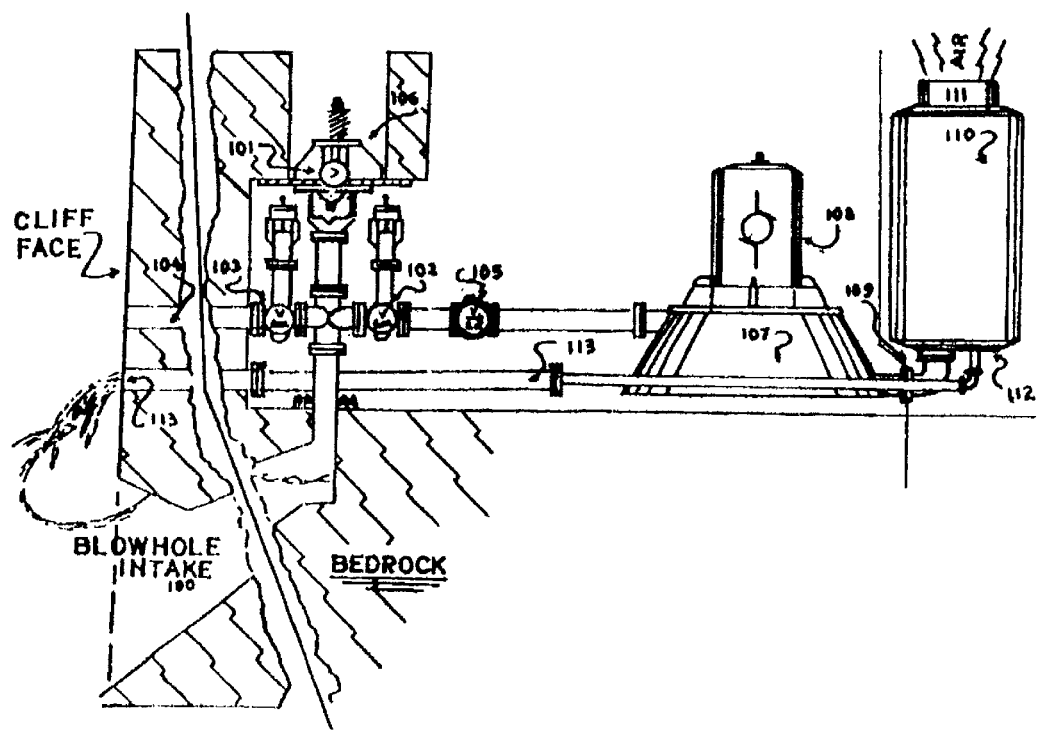
FIG.#1A

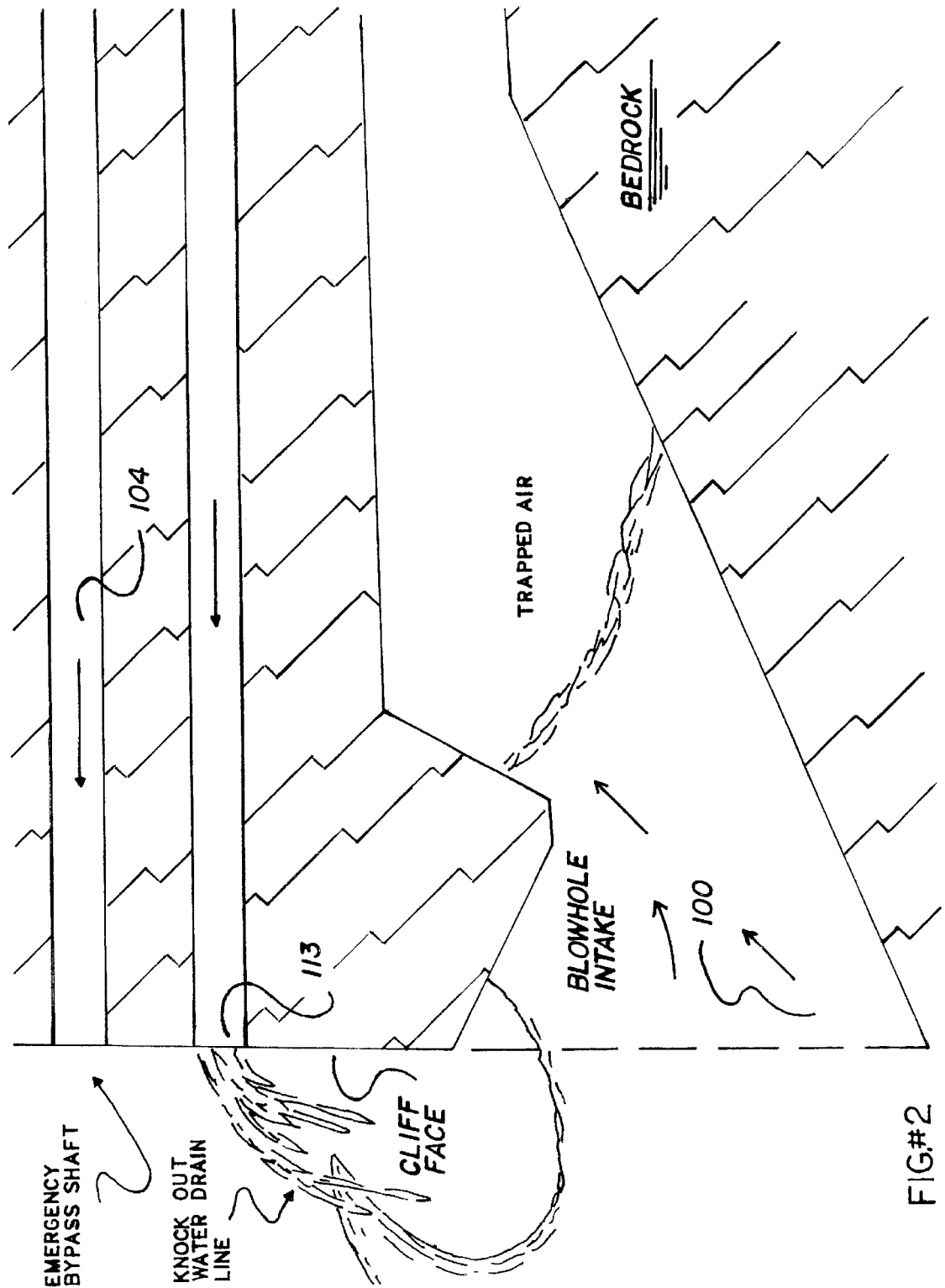
FIG#2

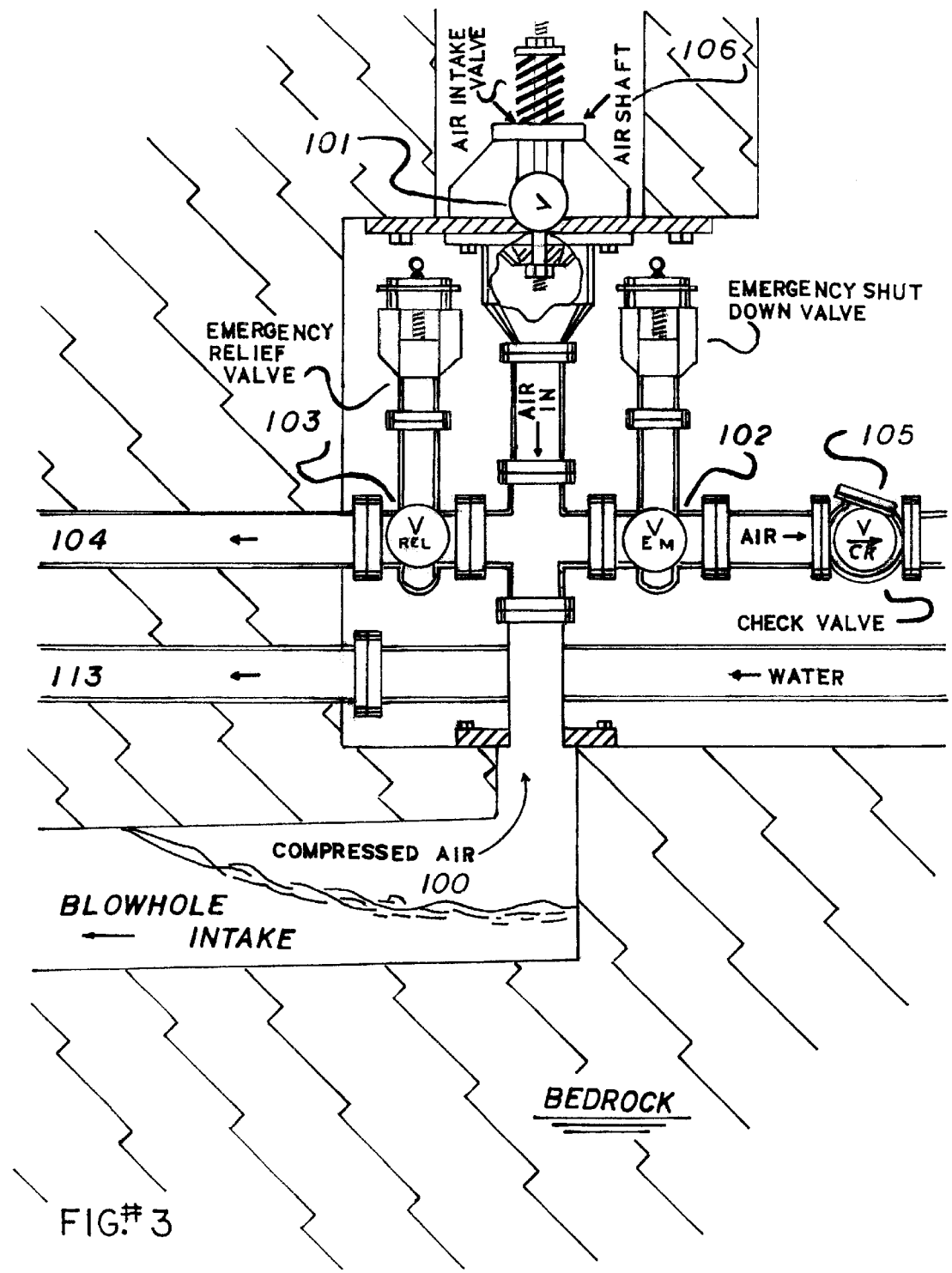
FIG. #3

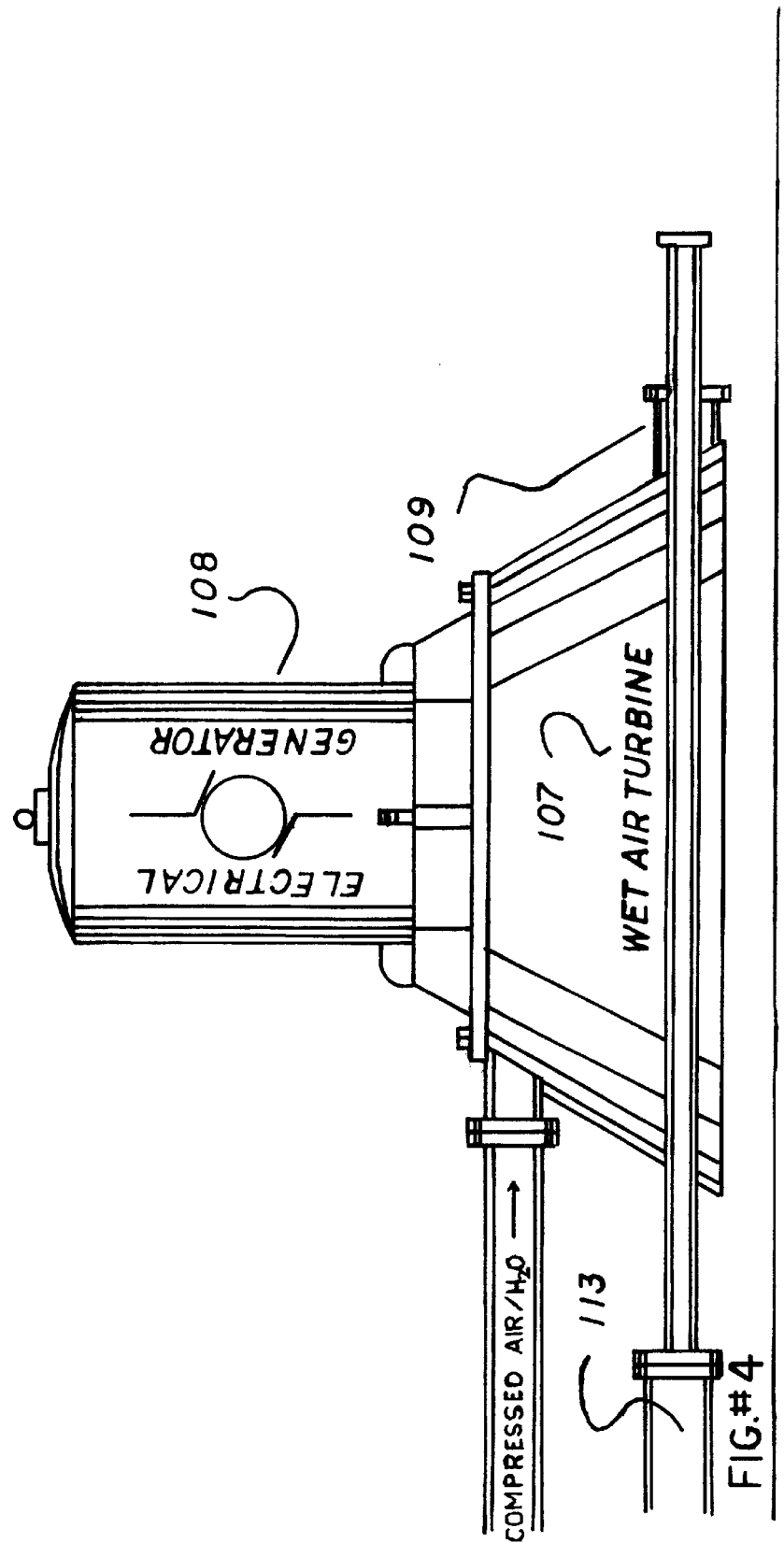

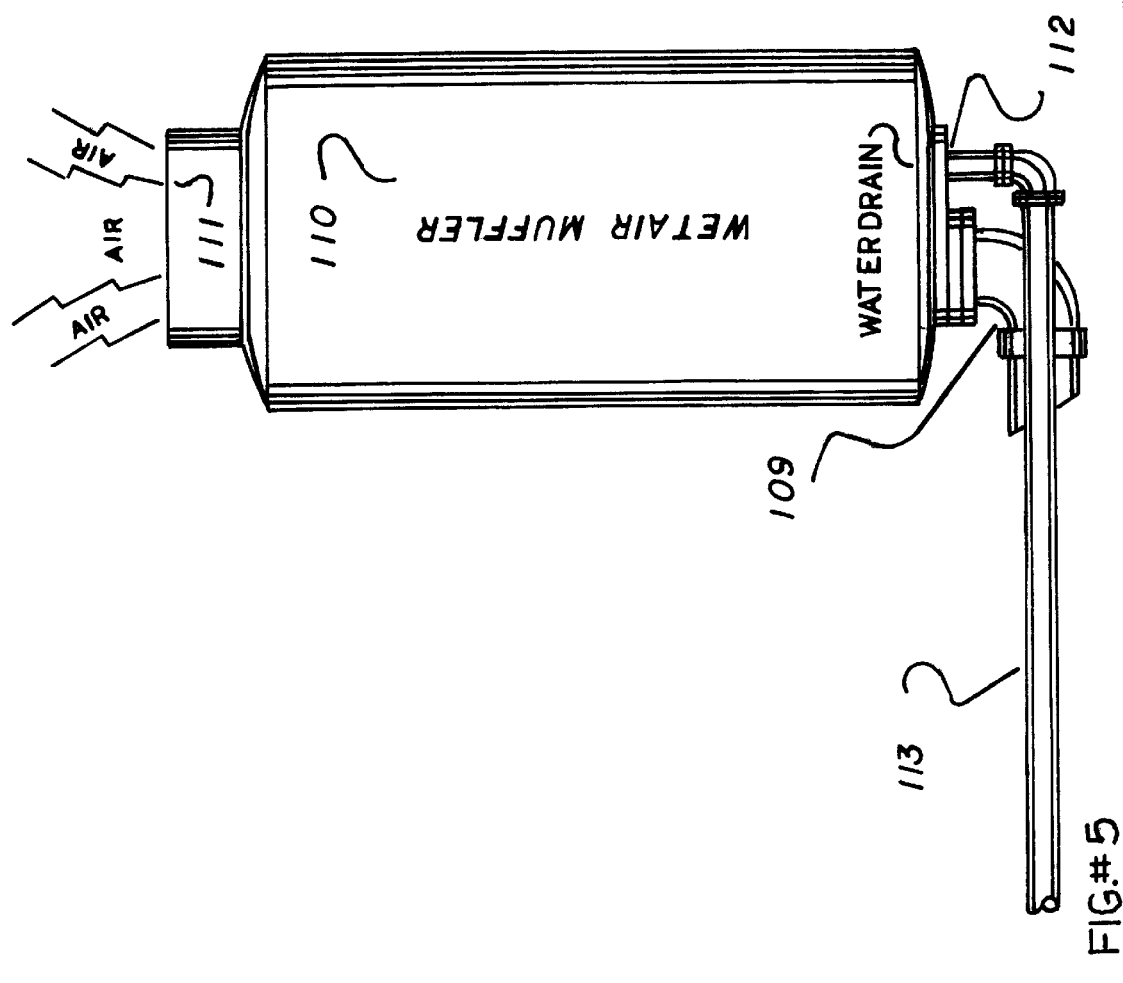

WAVE/BLOWHOLE ELECTRICAL POWER GENERATING PLANT

HISTORICAL BACKGROUND OF THE INVENTION

In the late 1960's I took up scuba diving as a hobby. As a result I became aware of the enormous force waves release in the tidal zone. This energy is released as the waves crash against a cliff face. Throughout the 1970's and 1980's I developed several mechanical concepts that could derive power from waves. In late 1989, I tested some of my models in the surf off San Pedro, Calif. After subjecting myself, and an array of plastic bucket chambers, p.v.c. pipes, float valves, check valves, pressure gauges, and tie down ropes to a number of beatings in the surf, I decided I was ready to go for a patent, which included the following:

1) a wave powered generator, 2) hydraulic pumps, and 3) air compression devices.

In late October 1991 I compiled my sketchee, and submitted them to Freilich, Hornbaker and Rosen, Patents Attorneys (10960 Wilshire Boulevard, Suite 1434, Los Angeles Calif. 90024, telephone number (213) 477-0578). The firm submitted my drawings for a patent search. On Nov. 12, 1991 they sent me a letter informing me that most of my patent submittals were variations of 16 existing patents. After I had reviewed the 16 copies of related patents, I realized that my concepts were similar in many ways to most of them.

After a few years of pondering the problems for some time, I realized that most of these mechanical contraptions are just too fragile to take the prolonged battering of the larger waves encountered in most large bodies of water. Because large waves would be required to produce energy in enough quantity for economical generation of electrical power, I realized that most of these devices, including mine, were not really economically feasible. It is apparent that these devices are far too vunerable to damage from large storms, and very expensive to maintain. As a result, I came to the obvious conclusion that it is futile to put such fragile, complicated, manmade objects in the way of such overwhelming natural forces. The real problem with most manmade structures resting on the geological formation in the tidal zone is their inability to withstand harsh conditions. These structures will be subjected to the most severe forces found in nature. Many of these structures will ultimately even have to face a weather condition called the 50- or 100-year storm. But by far the most devastating phenomenon has to be the ocean-born tsunami, which is a huge tidal wave capable of devastating most freestanding, manmade objects in its path. Because of these conditions, most shipwrecks upon being beached for any time are eventually beaten to pieces.

By the late 1990's, I came to the conclusion that the solution would be to go with what works the best under the worst of natural conditions. Naturally-occurring bedrock outcroppings along with other natural geological formations have withstood these severe natural conditions for thousands of years now, even though the shoreline itself is slowly being worn away by all the large storms over the years. Natural geological formations are vastly superior to manmade structures. From a geological standpoint, the harder and denser natural rock formations endure the best. Therefore, I decided that the best thing would be to construct manmade blowhole shafts in existing durable natural geological formations, using conventional heavy construction methods. Also, natural geological formations can withstand the severe battering of wave-driven flotsam (logs, shattered wood pilings, small and large watercraft which have lost their moorings during severe storms).

BRIEF SUMMARY OF THE INVENTION

My invention provides the most economical way to generate wave power through the use of highly efficient manmade blowholes sheltered in the natural geological formation. By incasing these manmade blowholes in the protection of the existing natural geological formation, they become the most durable, large storm survivable systems in the breakwater zone. This makes them the most cost effective method for generating compressed air from wave energy. These blowholes will provide large quantities of compressed air, and will be designed to match existing conditions for the individual characteristics of the coastal area where the design is to be developed. The design will take into consideration:

1) Tidal range (high and low tide).
2) Average wave crest (height of the average wave).
3) Salt water or fresh water application.
4) Number of blowholes required to maintain diminished operational efficiency during periods of less than normal wave activity.
5) The size of the blowhole intake, and the slope and length of the compressed air shaft will be based on all the related factors pertaining to the specific area of the installation.
6) Excess compressed air generated during peak wave activity will be used to bring additional electrical generating units on line. Additional excess air can be further compressed by second stage compressers to fill commercially available high pressure transmission pipelines, and high pressure system back up vessels. Further pressure build up can be vented through the emergency bypass shaft.

At this time we are looking at an ongoing rise in fuel prices nationwide, as well as worldwide. The cost of fossil fuel has been an environmental and financial burden on the back of the whole world, and especially the developing nations. The primary reason is greed. These dirty, environmentally dangerous forms of fuel have been used for decades now, poisoning the very air we breathe more and more with each decade. In a world with an exploding population, other forms of energy must be developed, to help clean up an already fossil fuel damaged planet. My invention will provide large quantities of low cost compressed air to operate air motors, and air driven water pumps, for the economical generation of electrical energy, and is a major step in the direction of cleaner fuels for the following reasons:

1) The exhaust from my power plant is over 99% pure air.
2) As more of these units come on line, less and less fossil fuel will be used for power generation.
3) The cost of electricity will also be driven down. Compressed air from wave energy is almost free.
4) With lower electrical costs the development of the electric car should become more attractive. This should help make a big dent in our real pollution problem—too many gas driven automobiles.

BRIEF DESCRIPTION OF THE DRAWINGS

FIG. 1 is a view of a bedrock cliff face as seen from the sea. The blowhole intakes (100) can be seen in the breakwater zone. The air intake shafts (106) can be seen on top of the cliff, along with the power distribution lines. Above the blowhole intake structures in the cliff face is clearly shown the emergency bypass shafts (104), and the knock-out water drain lines (113).

FIG. 2 is a cross-sectional side view of a blowhole intake structure (100), cut through the bedrock cliff face. The view shows trapped air and an incoming wave at the beginning of the compression cycle. Also shown is the emergency bypass shaft (104), and the knock-out water drain line (113) as they exit through the cliff face.

FIG. 3 is a cross-sectional side view of the compression end of the blowhole intake structure (100), where the compressed air is shown at the end of the blowhole intake water piston, as the compressed air moves up into the valve process piping. The drawing shows the emergency relief valve (103), and the associated emergency bypass shaft, which is activated only in an emergency situation. Under normal operating conditions, compressed air passes through the emergency shutdown valve (102), which only closes in an emergency situation in coordination with the opening of the emergency relief valve (103). The compressed air then passes through the open check valve (105), which closes only when when the receding water piston creates a vacuum that causes the air intake valve (101) to open, allowing fresh air to recharge the blowhole intake shaft (100), for the beginning of the next compression cycle. After leaving the check valve (105), the compressed air will travel through the compressed air pipeline on its way to the turbine. Also shown is the air intake shaft (106), and the knock-out water drain line (113).

FIG. 4 shows compressed air from the compressed air line entering the wet air turbine (107), which in turn generates electricity by rotating the electrical generator (108).

FIG. 5 Spent air from the tail of the wet air turbine (109) travels into the wet air muffler (110), where salt-water contaminated air is condensed out on the baffles in the wet air muffler (110). The spent air is then expelled out of the top of the exhaust (111). High noise levels are knocked down in the baffles on the inside of the muffler. The salt-water contaminated condensate water passes down through the bottom of the wet air muffler (112), which then empties into the knock-out water drain line (113), and will then empty out at the cliff face.

DETAILED DESCRIPTION OF THE DRAWINGS

This invention is based on the naturally occurring phenomenon of blowholes, as they occur in the natural geolocial formations along the shorelines of large bodies of water, often opening up as a result of cavitation taking place in a fault or defect in a bedrock outcropping. Eventually the action of air and water working in the fault will open up an air cavity within the pocket. This pocket eventually will, over time, break through to the surface, and when this occurs, a blowhole forms. When a large incoming wave crashes into the cliff face, water slams into the cavity, compressing trapped air in the top of the blowhole. The compressed air and water shoots out of the hole with great force, atomizing most of the water into a cloud of spray.

This invention calls for the engineered construction of highly effective manmade blowholes excavated into the natural geological formations (100). These manmade blowholes would be designed to suit the normal conditions of the area in which they are to be installed, taking into consideration the range between low tide and high tide, the average height of the average waves in the area, and other local factors. Additional manmade blowholes will often be needed in some cases where tidal variations are more extreme. Therefore manmade blowholes may be required at low tide, intermediate tidal zone, and at high tide (100). In this way when the low tide blowhole is flooded out, the intermediate tidal blowhole would come up, thus assuring that pressure would be available throughout the total tidal cycle.

FIG. #1 Shows waves entering the blowhole intake structures at the cliff face (100). Also shown are the air shafts (106) on the top of the cliff face, the emergency bypass shafts (104), and the knock out water drain lines (113).

FIG. #2 A wave enters the blowhole (100), trapping and compressing the air as the water piston moves into the tapering depths of the blowhole shaft which is incased in the protection of the natural geological formation.

FIG. #3 Shows compressed air at the compression end of the blowhole shaft. Compressed air is prevented from moving up and out of the air intake shaft (106) by the one-way air intake valve (101). At this stage the compressed air and blow-over water have one of two directions it can go:

1). In an emergency shut-down situation, the emergency shut down valve (102) closes and the emergency relief valve (103) will open, allowing the compressed air and blow-over water to exit through the emergency bypass shaft (104).

2). Under normal operating conditions, the compressed air and blow-over water move up the blowhole shaft. The emergency relief valve (103), and the air-intake valve (101) are closed. The compressed air and blow-over water then moves through the open emergency shut down valve (102), past the check valve (105), and into the wet air turbine (107) FIG. #4.

3). When a wave subsides in the blowhole shaft (100), it creates a vacuum. This vacuum opens the air intake valve (101) in the air intake shaft (106), which allows fresh air to quickly fill the blowhole shaft and intake (100), which then accommodates the next incoming wave.

FIG. #4 When the compressed wet air and blow-over water from the blowhole enters the wet air turbine (107), the blades in the turbine are set in motion by the force of the wet air as it moves through the turbine. In turn, this causes the shaft of the generator (108) to rotate, generating electrical power for commercial distribution over transmission lines.

FIG. #5 The spent wet air exits the tail end of the turbine, (109) and moves up into the wet-air turbine muffler (110). The wet air muffler is used to reduce turbine noise, and prevent salt water spray from being expelled with the exhausted air (111). The salt water mist is knocked out by the baffles in the wet air muffler (110). The air moves up through the baffles and exits out of the top of the muffler (111) as exhaust. The salt water condenses out onto the baffles and falls down through the baffles to the salt water drain at the bottom of the wet air muffler (112). The salt water free falls through the drain, and flows down through the knock-out water drain line (113). This drain line then expels the salt water out through the cliff face above the blowhole opening.

The compressed air generated by these madmade blowholes can be used to power other commerical applications such as conventional wet or dry air motors, air driven water pumps, and air turbines. The commercial sector can be supplied with compressed air through high-pressure transmission pipelines. These pipelines can be laid to industrial areas further inland in much the same way as high-pressure gas lines are operated. Installation of these manmade blowholes in the tidal zones of large bodies of water should be accomplished by using conventional heavy construction methods for earth excavation, soil stabilization or underground tunneling methods in high density rock formations.

I claim:

1. A system for converting water wave energy into the production of compressed air, the system comprising a manmade blowhole constructed inside the protection of a natural geological formation, wherein the manmade blowhole is a long tapering shaft in which large waves can enter at an opening in said natural geological formation, said waves race up said shaft as a water piston, said large waves rise and fall in the said tapered shaft with the cycle of each consecutive wave, the air trapped in front of said water piston is compressed as said water piston moves deeper into said tapering shaft, said compressed air is allowed to vent off through an emergency relief valve during emergency shutdown situations or storms, said emergency relief valve allows said compressed air to vent out through the natural geological formation when said emergencies occur, under normal operation said compressed air will travel through an emergency shutdown valve that will only close during said emergency shutdown situations or storms, and then will pass through a one-way check valve which will prevent said compressed air from being drawn back into said blowhole shaft as said wave subsides, when said wave subsides a resulting vacuum forces a fresh air intake valve to open as the receding wave moves back out of said blowhole and fresh air rushes through said air intake valve to fill said blowhole shaft with outside air in preparation for the next incoming wave, said compressed air that is generated passes through said check valve and enter a compressed air header piping which feeds one of air-driven turbines that run electrical generators, and excess compressed air is collected in air dehydration vessels and stored in back up compressed air storage vessels that are connected to high pressure pipelines for use inland.

2. The system according to claim 1, wherein cracks, faults, and fissures in the natural geological formation are repaired or corrected by means of one of pressure grouting, gunnited concrete, reinforced concrete, welded steel structure, and the implementation of bulkheads.

* * * * *